United States Patent

Trago et al.

[11] Patent Number: 5,806,169
[45] Date of Patent: Sep. 15, 1998

[54] METHOD OF FABRICATING AN INJECTED MOLDED MOTOR ASSEMBLY

[76] Inventors: Bradley A. Trago, 922 Cerasus Dr., Rockford, Ill. 61108; Edward J. Byrnes, 116 Woodland Ct., #1D, Carpentersville, Ill. 60110; Griff D. Neal, 2600 N. Southport Ave., Unit 31, Chicago, Ill. 60614

[21] Appl. No.: 415,639

[22] Filed: Apr. 3, 1995

[51] Int. Cl.$^6$ .................................................. H02K 15/04
[52] U.S. Cl. ........................... 29/596; 264/272.2; 310/42; 310/43; 310/90
[58] Field of Search ........................ 29/596, 598; 310/42, 310/43, 90, 71; 264/272.2, 272.19

[56] References Cited

U.S. PATENT DOCUMENTS

| | | | |
|---|---|---|---|
| 2,916,642 | 12/1959 | Macks | 310/90 |
| 3,046,604 | 7/1962 | Graham et al. | |
| 3,156,076 | 11/1964 | Origoni et al. | 29/596 |
| 3,258,624 | 6/1966 | Turk | 310/261 |
| 3,433,986 | 3/1969 | Arutunoff | 310/90 |
| 4,015,154 | 3/1977 | Tanaka et al. | 29/596 |
| 4,029,977 | 6/1977 | Chai et al. | 310/49 |
| 4,200,344 | 4/1980 | Binns et al. | 310/90 |
| 4,382,199 | 5/1983 | Isaacson | 310/90 |
| 4,538,084 | 8/1985 | Kawada et al. | 310/217 |
| 4,549,105 | 10/1985 | Yamamoto et al. | 310/43 X |
| 4,626,725 | 12/1986 | Kawada et al. | 310/89 |
| 4,696,631 | 9/1987 | Nitt | 29/596 X |
| 4,712,028 | 12/1987 | Horber | 310/49 |
| 4,713,570 | 12/1987 | Mastromattei | 310/154 |
| 4,763,034 | 8/1988 | Gamble | 310/181 |
| 4,781,610 | 11/1988 | Mercer | 310/71 |
| 4,841,190 | 6/1989 | Matsushita et al. | 310/257 |
| 4,922,604 | 5/1990 | Marshall et al. | 29/598 |
| 5,008,572 | 4/1991 | Marshall et al. | 310/45 |
| 5,073,735 | 12/1991 | Takagi | 310/43 X |
| 5,191,698 | 3/1993 | Sumi et al. | 29/596 |
| 5,331,237 | 7/1994 | Ichimura | 310/44 |
| 5,333,957 | 8/1994 | Yip et al. | 385/484 |

FOREIGN PATENT DOCUMENTS

| | | |
|---|---|---|
| 0553811 | 8/1993 | European Pat. Off. |
| 0562146 | 2/1959 | Italy ............... 264/272.2 |
| 56-094952 | 7/1981 | Japan. |
| 59-105864 | 6/1984 | Japan. |
| 59-220051 | 12/1984 | Japan. |
| 31120 | 1/1995 | Japan. |
| WO 91/09441 | 6/1991 | WIPO. |

*Primary Examiner*—Carl E. Hall
*Attorney, Agent, or Firm*—Leydig, Voit & Mayer

[57] ABSTRACT

An electrical motor and the process for forming that motor utilizes injection molding techniques to unitize the stator assembly. The stator assembly includes a stator lamination stack and preferably a metal front end cap which is secured to the lamination stack after the lamination stack is insulated and wound. The windings are terminated at a plurality of conductive pins fusion welded to the terminating ends of the windings. The stator assembly with front end cap in place is positioned in an injection molding die. Pressure is applied to the die, and molten plastic is injected under pressure to fill voids in the stator assembly, and also to form a plastic mass which will serve as the rear end cap. The rear end cap is also molded with a connector portion which fixes the conductive pins in place as a part of the connector. A bore formed in the stator assembly provides mounting surfaces for bearings on a rotor assembly.

28 Claims, 10 Drawing Sheets

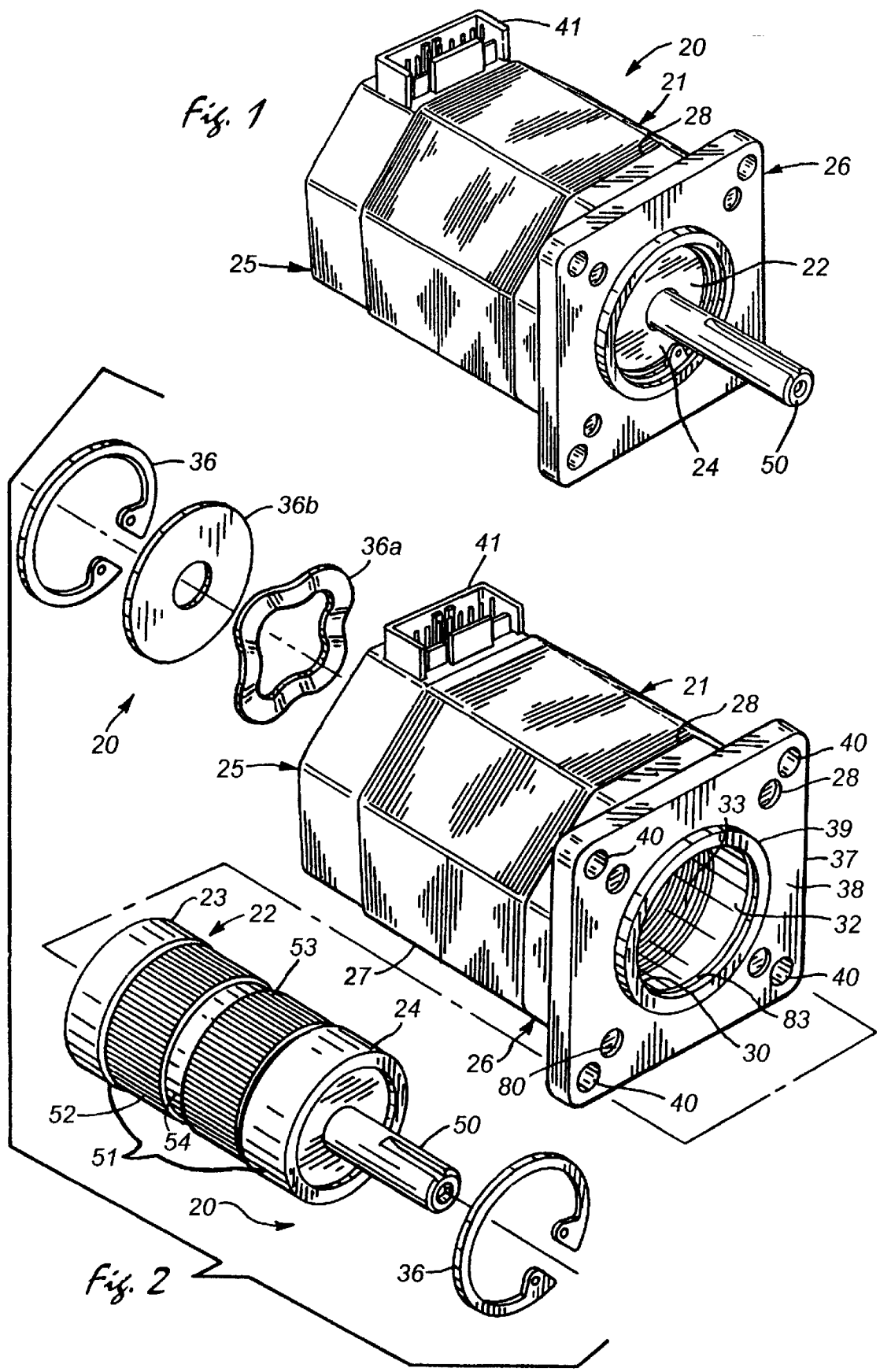

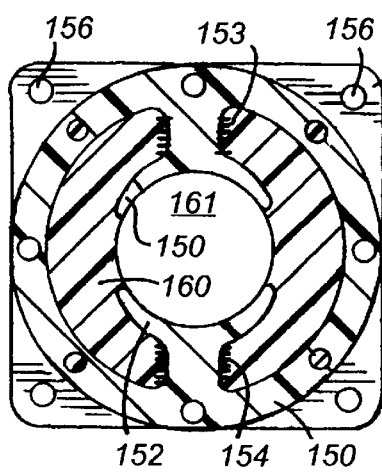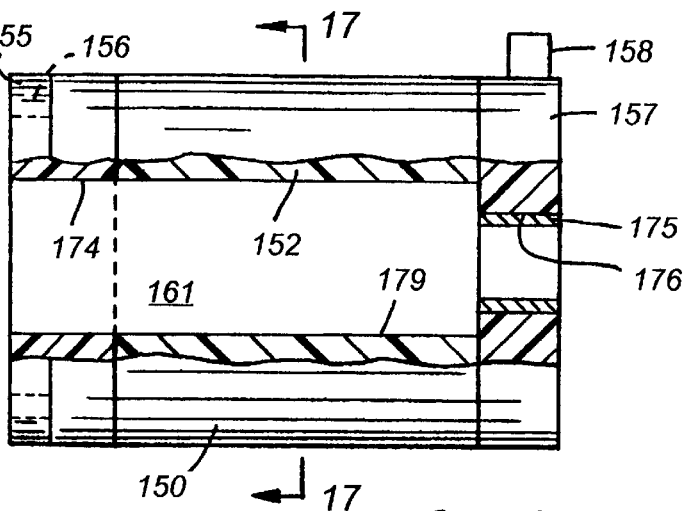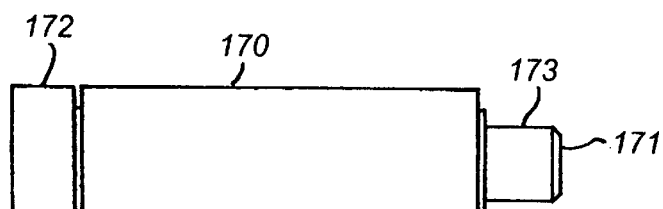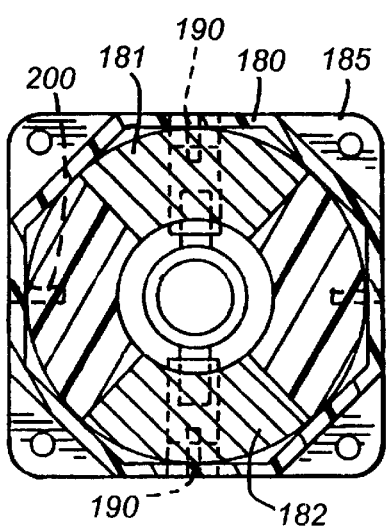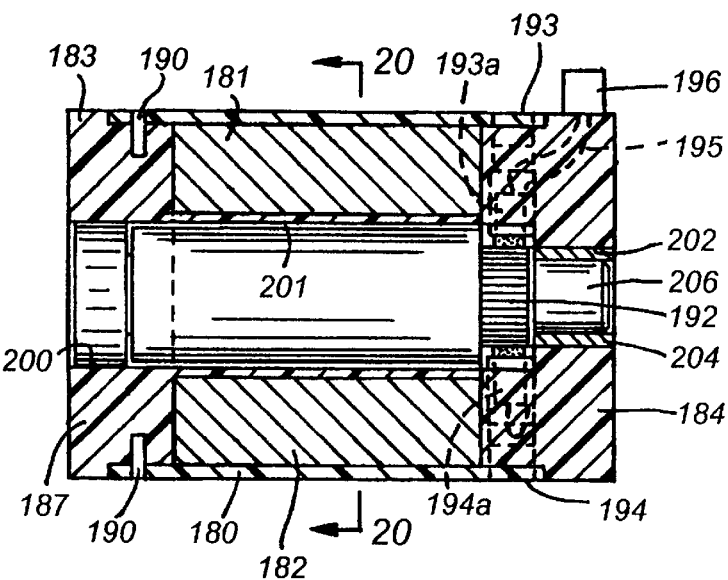

METHOD OF FABRICATING AN INJECTED MOLDED MOTOR ASSEMBLY

BACKGROUND OF THE INVENTION

1. Field of the Art

The present invention relates to electric motors, and more particularly to a fabrication method and related assembly of potted electrical motors.

2. Discussion of the Related Art

U.S. Pat. Nos. 4,922,604 to Marshall et al. and 5,008,572 to Marshall et al., both assigned to an assignee of the present invention and hereby incorporated by reference, describe an electrical motor and fabrication method for achieving precise bearing registration of an internally disposed rotor assembly. As described more fully in the aforementioned references, an electrical motor comprising stator and rotor assemblies is fabricated by utilizing a potting compound to both unitize the stator assembly and provide improved thermal characteristics.

More particularly, the stator assembly is formed from a stack of stator laminations having inwardly projecting poles that define the walls of an unfinished internal chamber for housing a rotor assembly. Through-bolts attach front and rear aluminum end caps to the lamination stack, and this entire stator assembly is potted to unitize the lamination stack and fill voids between the stator poles with potting compound. The internal chamber is then finished by machining a continuous, cylindrical bore substantially coincident with the sidewalls defined by the inwardly projecting stator poles. Precision registration of the rotor assembly is achieved by aligning end bearings on the rotor shaft with internal receiving surfaces machined in the stator end caps; the receiving surfaces being part of the cylindrical bore.

While the motor and fabrication method described in the '604 and '572 references achieve substantial advances over the prior art, further improvements are still desired. In this regard, various features of the assembly and method described in the '604 and '572 references were identified for improvement.

One area sought to be improved relates to the potting of the stator assembly. Specifically, it has been determined empirically that a double cure cycle is desired for the potting compound; the second cure cycle improves the rigidity of the stator assembly, thereby yielding more efficient operation over the life of the motor. When only a single cure cycle is employed it has been found that, after a period of use, the rotor assembly occasionally locks within the stator assembly, thereby limiting the useful life of the motor. Adding a second cure cycle, however, undesirably increases manufacturing costs.

A related aspect sought to be improved is the removal of air pockets formed within the potting compound. As discussed in the '572 and '604 references, air is a poor thermal conductor. Filling the otherwise open space between the stator poles with potting compound, improves thermal conductivity and, accordingly, improves dissipation of the heat developed within the motor. The process used in potting the stator assembly, however, is known to leave an air pocket under the rear end cap. This impedes the flow of heat from the rear end cap. Therefore, further improvements in the thermal characteristics of the motor assembly are sought by eliminating the air pocket.

Another area sought to be further improved relates to providing external electrical connections to the stator windings within the motor assembly. As described in the '572 and '604 references, an insulator having connectors is seated against the rear end of the stator lamination stack. The terminating ends of the stator windings are brought out to the connectors, and a printed circuit board is configured to plug into connectors, establishing electrical continuity between the stator windings and conductive traces on the printed circuit. A second connector having conductive pins electrically connected to the conductive traces on the printed circuit, is provided in conjunction with the printed circuit board to accommodate remote access to the stator windings by way of a complementary external connector. In this way, external signals are readily connected to the stator windings for controlling the motor operation.

This second connector is nested within the rear stator end cap. As previously described, both end caps are attached to the lamination stack by means of several through bolts, before the potting compound is applied. To prevent any potting compound from leaking between the rear end cap and the second connector, a sealing means is provided around the second connector. Although the aforementioned structure provides an effective means for connecting external motor drive signals to the stator windings, a simpler and therefore more cost-effective solution is desired.

In short, improvements are sought which will more efficiently address the aspects described above, while maintaining the benefits and advantages in the motor assembly and method as described in the '572 and '604 references.

SUMMARY OF THE INVENTION

In view of the foregoing, it is a primary aim of the present invention to simplify and, thereby, achieve a lower cost motor assembly and fabrication method, than that presently known.

Another object of the present invention is to provide an electrical motor assembly having improved thermal characteristics.

In more detail, it is an object of the present invention to eliminate the small air gap between the potted windings and the metal of the aluminum end cap. In even greater detail, an object of the present invention is to provide high dielectric paths of good thermal conductivity between the electrical conductor and pole structure and the exterior of the motor, in order to increase the capacity of the motor to dissipate heat.

Another object of the present invention is to provide an electrical motor fabrication method that simplifies the method previously known and used by eliminating the cost and time demanded by a second potting compound cure cycle, while maintaining the structural integrity of the final motor assembly.

Still another object of the present invention is to provide an electrical motor assembly having a simplified and thus improved electrical connection between the internal stator windings and an external connector.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, one aspect of the present invention is directed to a method of producing an electrical motor, wherein an intermediate or unfinished stator assembly is formed by compiling a stack of stator laminations and stator windings. The intermediate stator assembly is then placed into a mold, and molten plastic is injected under pressure into the mold, whereby the molten plastic is forced into and fills interior voids between poles of the intermediate stator assembly. The molten plastic also forms a rear end cap for the stator assembly. The plastic used in this invention may be any thermoplastically processible resin, or blends of such resins. The resin may optionally include additives such as flame retardants, reinforcements, colored pigments, fillers, plasticizers, heat or light stabilizers. Next, a continuous bore is machined through the center of the molded stator assembly to produce a concentric bore for housing a rotor assembly; the bore also providing mounting surfaces for receiving rotor assembly bearings. Finally, the rotor assembly is mounted into the stator assembly by inserting the rotor assembly into the continuous bore and engaging the rotor bearings with the mounting surfaces.

A related aspect of the present invention is directed to the injection molded electrical motor assembly, which includes a rotor assembly having a central rotor portion on a rotor shaft, and a rotor bearing disposed near each end of the rotor shaft. A unitary stator assembly includes a stator lamination stack which forms stator poles that carry stator windings, and front and rear end caps. The stator poles and windings are substantially encapsulated by an injection molded plastic mass, which fills the space between the stator poles. The molded plastic also integrally forms the rear end cap. A continuous bore formed in the stator assembly through the front end cap, the stator lamination stack, and the rear end cap, forms mounting surfaces in the end caps for receiving the rotor bearings; the rotor assembly being carried within the bore by an engagement between the rotor bearings and the mounting surfaces in the end caps.

Having summarized the present invention above, the discussion will now be directed to a preferred embodiment of the invention. As an intermediate step of the fabrication process of a preferred embodiment, a matrix of conductive pins is fusion welded to the stator windings. The rear end cap is formed by the injection molded molten plastic to surround the matrix of pins and form a connector housing about the conductive pins. In this way, the motor assembly provides a connector that is readily adapted for electrical connection to an external or remote source for controlling the motor. The injection molded end cap is an extension of the injection molded mass in the stator, and thus provides an efficient continuous path for dissipation of heat generated in the windings.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is a perspective view illustrating a completely assembled motor constructed in accordance with one embodiment of the present invention;

FIG. 2 is a partially exploded view showing a motor according to the invention with the rotor assembly removed from the stator assembly;

FIG. 16 is a partly broken away side view, and FIG. 17 is an axial section taken along the line 17—17 of FIG. 16, respectively, showing an alternative construction of motor adapted for practice of the present invention;

FIG. 18 is an elevational view of a rotor assembly for the motor of FIGS. 16 and 17; and FIGS. 19 and 20 are an elevational cross section and an axial cross section taken along the line 20—20 at FIG. 19, respectively, showing a permanent magnet motor adapted for practice of the present invention.

Figure 3:
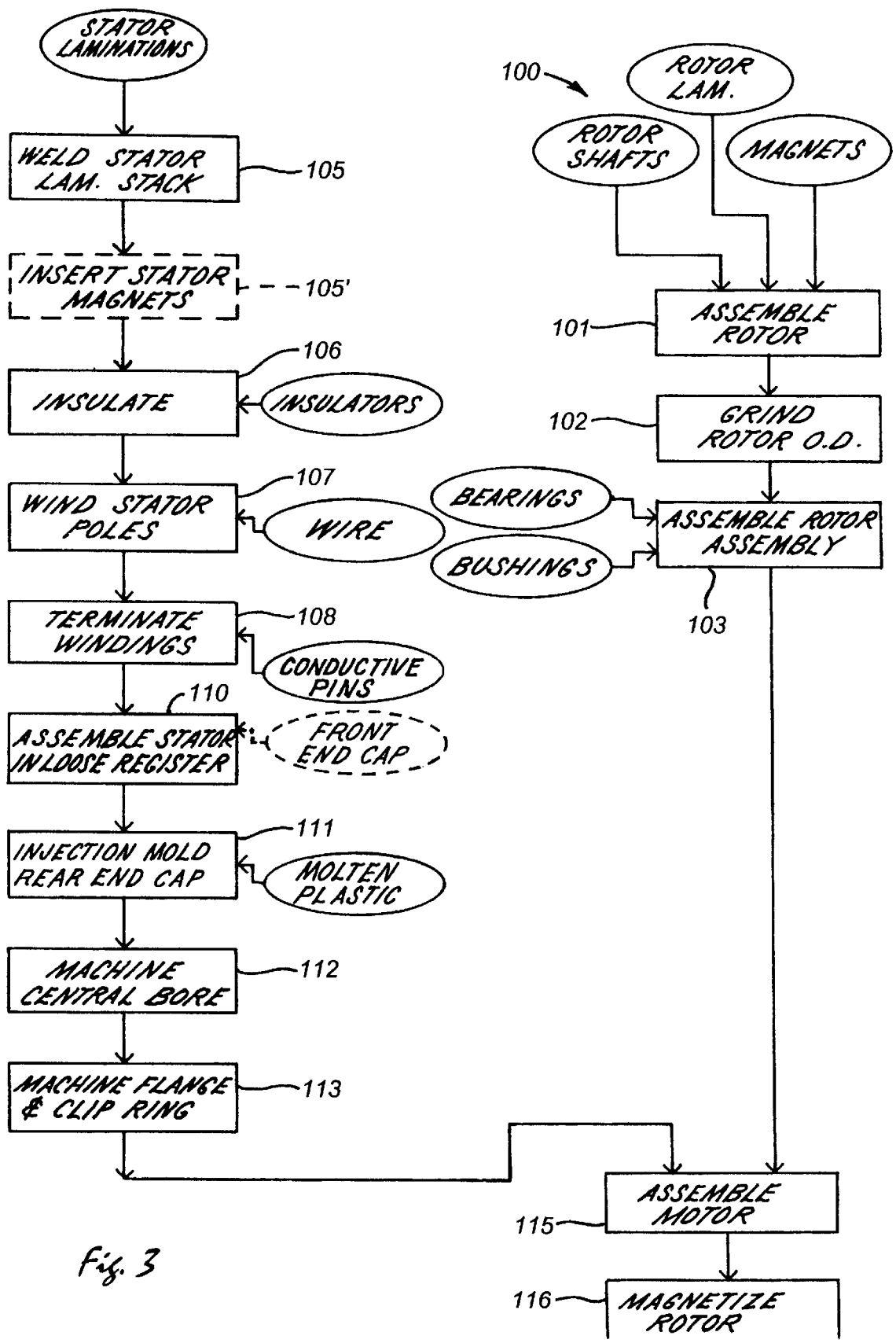
FIG. 3 is a process flow chart illustrating the steps of constructing a motor in accordance with the preferred embodiment of the present invention.

Reference will now be made in detail to various presently preferred embodiments of the invention, examples of which are illustrated in the accompanying drawings.

DETAILED DESCRIPTION OF THE PREFERRED EMBODIMENTS

Turning now to the drawings, FIG. 1 shows a perspective view of a hybrid permanent magnet stepping motor, and FIG. 2 a partly exploded view showing the rotor and rotor retaining elements removed from the stator assembly. It will be noted at the outset, however, that while the invention will be described in connection with a hybrid stepping motor, it is also applicable to other motor types. For example, the invention is applicable to brushless variable reluctance stepping motors, permanent magnet brushless motor designs, switched reluctance motors, enhanced variable reluctance motors, as well as enhanced and unenhanced stepping motors of the hybrid stepping type. Finally, induction motors could also utilize the present invention as could other motor types as will be apparent to those skilled in the art upon reading the following detailed description.

Referring to FIGS. 1 and 2, there is shown a hybrid stepping motor generally designated by reference numeral 20 comprised of a stator assembly 21 and a rotor assembly 22. The rotor assembly is fitted with bearings 23, 24 which in turn mount in end caps 25, 26 that support the rotor assembly 22 for rotation in the stator assembly 21. The end caps 25, 26, sandwich a central stator lamination stack 27 that forms stator poles which carry stator windings (not shown in FIGS. 1 and 2). In the presently preferred embodiment, the stator laminations are aligned in registry and initially secured by weld joints 70 (See FIG. 7) along the corners of the lamination stack. As will be described in greater detail below, the lamination stack is further secured by means of a high-strength injection molded plastic which completely encapsulates the interior of the lamination stack and preferably projects partly into a central bore 30 after molding. The bore 30 is then machined as by honing to form bearing surfaces 31, 32 (See FIG. 9) in the end caps 25, 26 and also to form a smooth bore 30 through the lamination stack 27, contiguous with the bearing surfaces 31, 32.

In the illustrated embodiment of FIG. 2, retaining rings 36 secure the rotor assembly 22 in the stator assembly 21. In another embodiment, the rotor assembly 22 is retained in the stator assembly by a press-fit engagement between bearings 23, 24 and receiving surfaces 31, 32. The front end cap 26 has a flange 37 which in turn has a machined surface 38 with a mounting boss 39 to locate the motor in a mounting bracket. Mounting holes 40 provide means for mounting the motor to its bracket (not shown). The rear end cap 25 includes an integral electrical connector 41 for supplying power to the stator windings.

As shown in FIG. 2, the rotor assembly 22 includes a rotor shaft 50 which supports a rotor section 51, (i.e., the portion of the rotor which is magnetically active) and outboard bearings 23, 24. In the illustrated embodiment, the rotor comprises toothed lamination sections 52, 53 separated by a permanent magnet 54. The magnet is positioned to provide the lamination sections 52, 53 with opposite magnetic polarities making, for example, lamination section 52 a north pole and lamination section 53 a south pole. In one embodiment, the laminations are formed with external teeth, of the same pitch as the teeth associated with the stator poles of the stator assembly. Other ratios of stator/rotor pitch can also be used such as 52/50 or 48/50. As is known in the art, the teeth of section 53 are offset by about one half pitch with respect to the teeth of the section 52 in order to form a hybrid permanent magnet rotor. Thus, when the stator windings are energized by a drive current coupled through the pins of connector 41, the rotating magnetic field which is produced in the stator tends to successively align the teeth of rotor lamination sections 52, 53, with the field of the stator teeth, causing the motor to step in sequence. Control of the rotational rate and direction of the stator field thus allows control of the rate and direction of rotor rotation.

Figure 4:
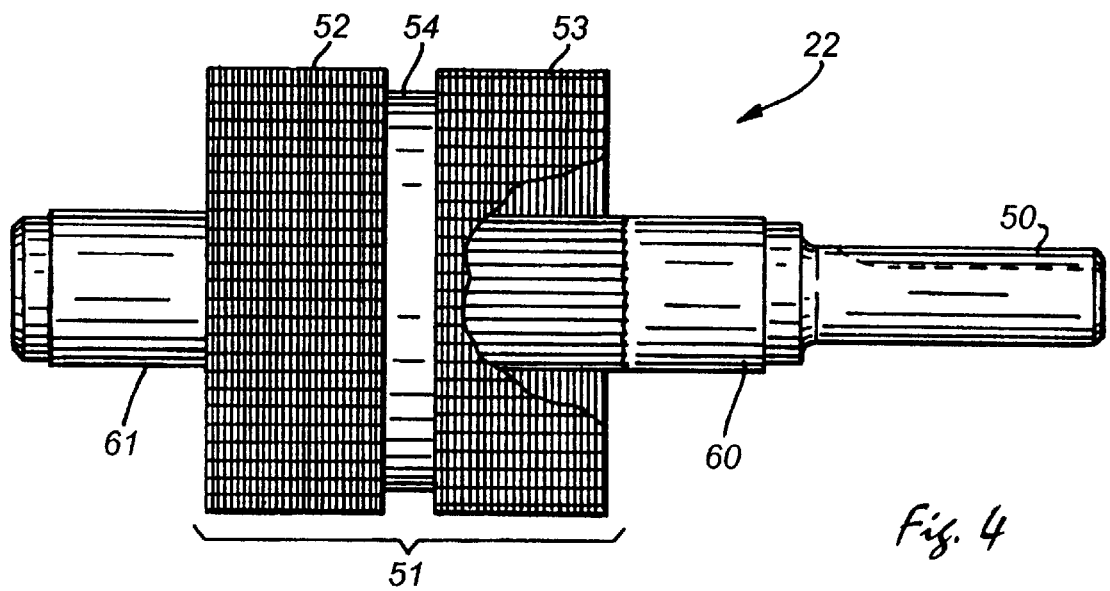
FIG. 4 is an elevational view illustrating a partially assembled rotor, including a partial cut-away view.

Turning now to FIG. 3, there is illustrated the process for fabricating a motor in accordance with the present invention. Concentrating first on the rotor assembly, it is seen that the primary raw materials which go to make up the rotor are brought together at process step 100, and include rotor shafts, rotor laminations (or prestacks) and magnets. Those items are assembled at a step 101 and the assembled rotor which results is best illustrated in FIG. 4. There is shown a rotor shaft 50 having a pair of lamination stacks 52, 53 disposed thereon, with a permanent magnet 54 interposed between the lamination stacks forming a rotor section 51 intended to be driven by the rotating magnetic field produced by the stator. In a hybrid permanent magnet stepping motor, the rotor laminations 52 and 53 have alternate teeth and valleys of a given pitch related to (as described above) the pitch of the teeth on the stator poles. Moreover, the teeth in the sections 52 and 53 are offset with respect to each other by one-half pitch. The magnet 54 serves to magnetically polarize the stacks 52, 53 with, for example, the stack 52 being a north pole and the stack 53 being a south pole.

The shaft 50 has a pair of machined sections 60, 61 adapted to receive the inner race of bearings 23, 24 (FIG. 5) for support of the rotor within the stator assembly. The shaft 50 can have its output end keyed as illustrated, unkeyed if desired, or with any other adaptor configuration. The motor can also be configured with an output shaft on the rear end to form a double-ended motor. Such constructional details form no part of the present invention and will not be emphasized herein.

Having assembled the rotor 22 in step 101 (FIG. 3), the rotor is then passed to a grinding station where step 102 is performed to grind the rotor outer diameter. Such grinding tends to produce teeth in the lamination stacks 52, 53 which have relatively sharp corners. In addition, the grinding step produces a rotor which is substantially concentric and therefore can operate in a carefully machined stator bore with a relatively small air gap.

Having thus configured the rotor magnetic section 51, and after machining debris is cleaned from the rotor, a step 103 is then performed in which bearings 22, 23 are assembled onto the bearing support surfaces 60, 61 of the rotor. In the exemplary embodiment, spacer bushings 62, 63 are interposed between the bearings 23, 24 and the lamination stacks 52, 53 respectively. The bushings ride between the lamination stack and the inner race of the bearings to form a spacer element to properly locate the bearings on the shaft. The bearings are press fit on the shaft, preferably in an appropriate fixture, in the step 103.

Figure 5:
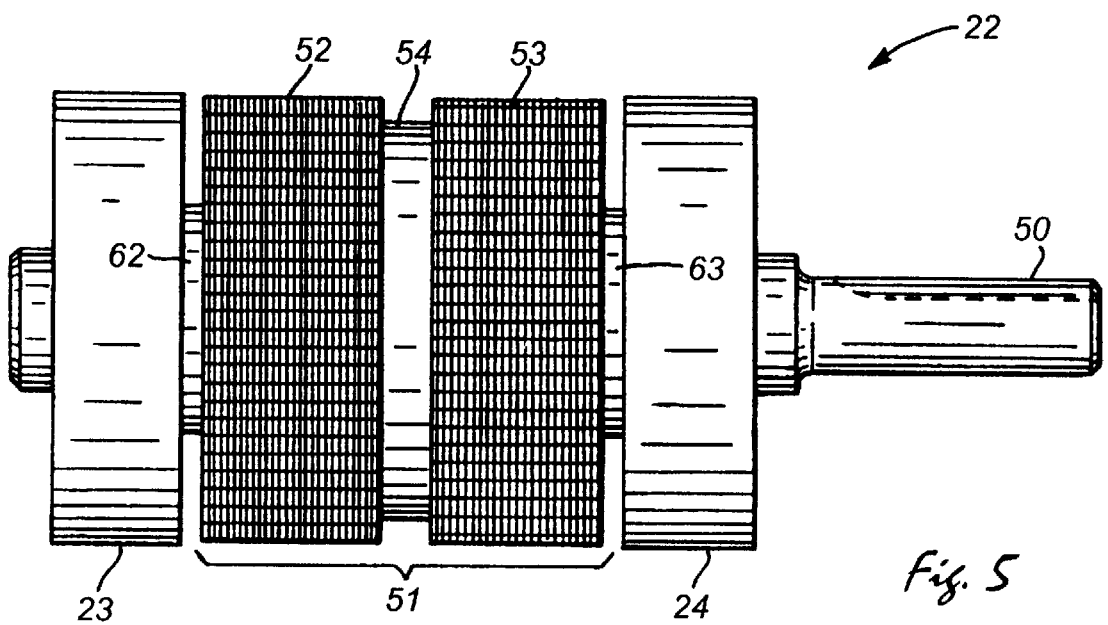
FIG. 5 is an elevational view illustrating a rotor assembly with bearings and bushing in place and ready for insertion into a stator assembly.

Referring to FIG. 5, there is shown the rotor assembly including bearings 23, 24 and the spacing bushings 62, 63, providing a rotor assembly which is ready for insertion into a stator assembly. FIG. 5 illustrates, in somewhat exaggerated fashion, the fact that the outer diameter of the bearings 23, 24 is slightly greater than the outer diameter of the rotor section 51. It was previously noted that the stator bore is a continuous straight through bore formed in a single operation after assembly of the stator. Thus, providing the bearings 23, 24 with a slightly greater outer diameter than the rotor section 51 allows the entire rotor assembly to be inserted into the bore, with the outer race of the bearing 23, 24 seating in the bearing surfaces of the end caps while the rotor section 51 has a sufficient, although a very small, clearance for rotation. The precision thereby achieved allows the motor to be configured with a relatively small air gap, thus providing higher torque and efficient operation.

Figure 6:
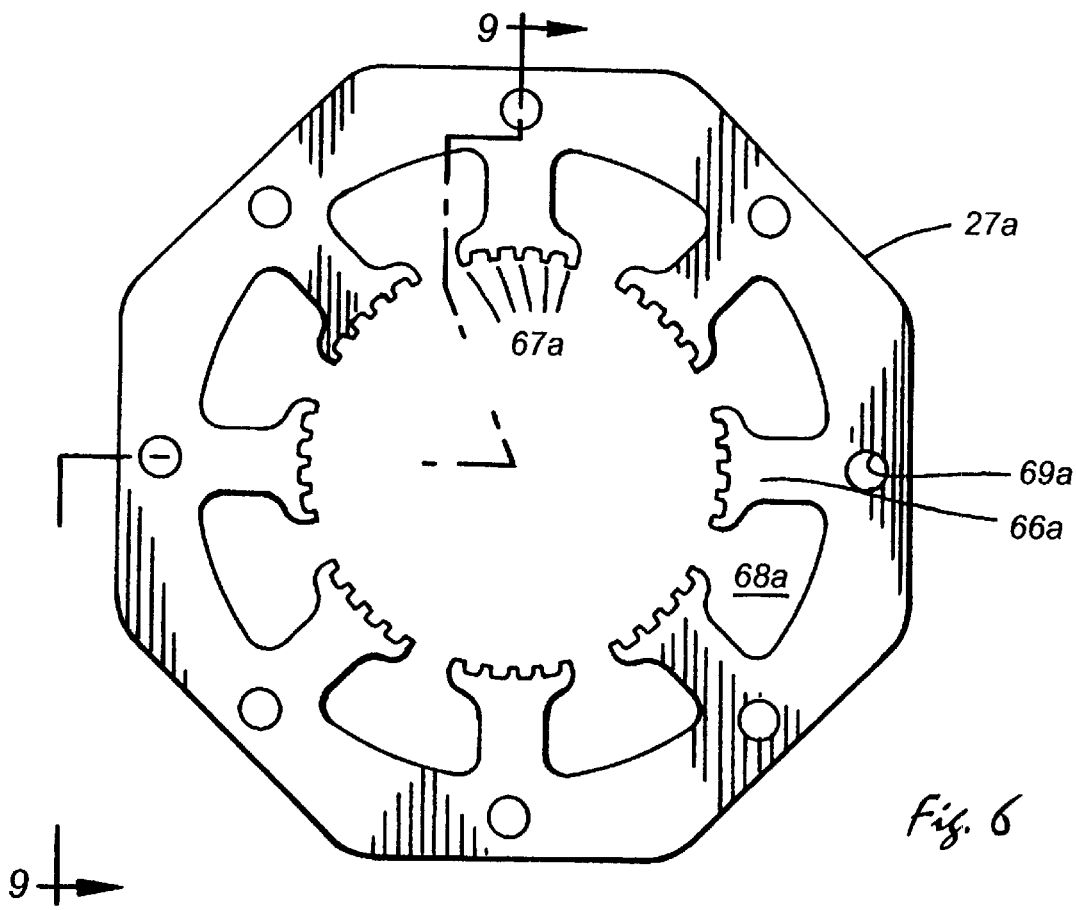
FIG. 6 is an elevational view of an individual stator lamination, illustrating the inwardly directed stator poles and pole teeth.

As illustrated in FIG. 3, the initial raw material component for the stator assembly procedure is individual stator laminations which are assembled in a step 105. An individual lamination 27a is illustrated in FIG. 6. it is seen that each lamination, which can be formed by stamping, has a series of poles 66a with a plurality of teeth 67a formed on each of the poles. The poles 66a are separated by gaps 68a which provide an area for receiving the stator windings. The laminations also have punched clearance holes 69a through which alignment bolts can pass for initially registering the stator assembly. Preferably a clearance hole 69a is associated with each pole 66a such that the stator laminations are symmetrical and can be installed in any of eight orientations. Thus, it is possible in assembly to turn the stator laminations with respect to each other such that the grain of the steel from which the laminations are made is not in a single direction, allowing the magnetic properties of the lamination stack due to grain to be averaged.

Figure 7:
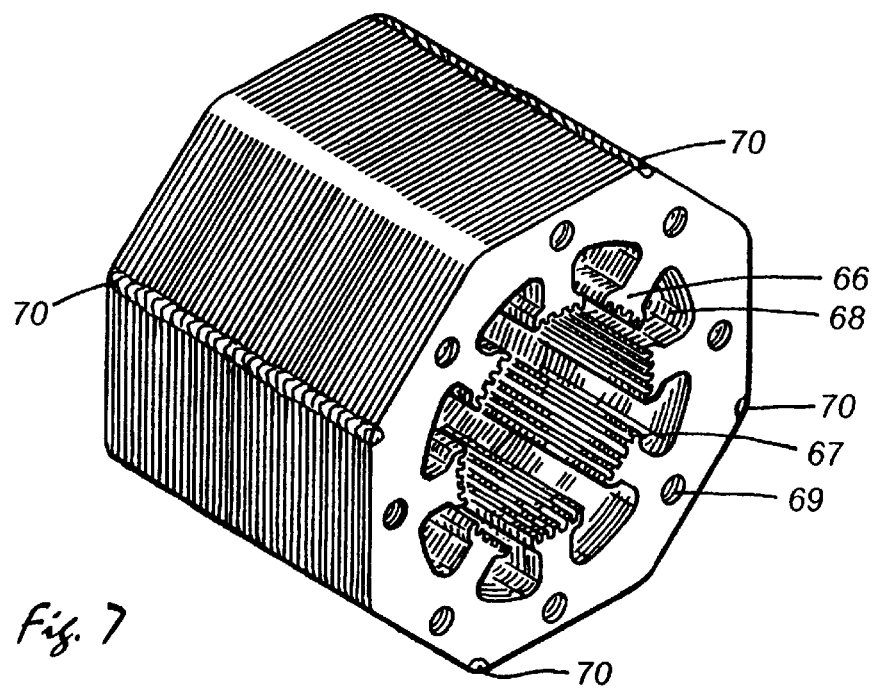
FIG. 7 is a perspective view showing an assembled stator lamination stack made up of individual laminations as illustrated in FIG. 6.

As illustrated in FIG. 7, the step 105 (FIG. 3) is implemented by assembling a stack of laminations of a predetermined height and affixing the laminations together, in the illustrated embodiment by means of welds 70. Alternatively, prestacks (i.e., groups of laminations joined by stamped dimples formed during the laminations stamping operation) may be used. Using the welding technique, preferably a stack of laminations is placed under pressure, and automatic machinery gauges that the laminations stack is of the appropriate height before the welds are made. If it is not laminations are either added or removed until the desired height is obtained at which point automatic welding equipment preferably applies four welds 70 at corners of the lamination stack displaced 90 degrees from each other. As seen in FIG. 7, the assembled lamination stack thereupon provides a pole structure 66 separated by inter-pole winding gaps 68, each pole structure having axially disposed teeth 67 of a predetermined pitch. It is also seen that the anchor holes 69 are aligned such that an alignment bolt or injection molding needle can pass through the lamination stack at the appropriate point in the assembly process.

Figure 12:
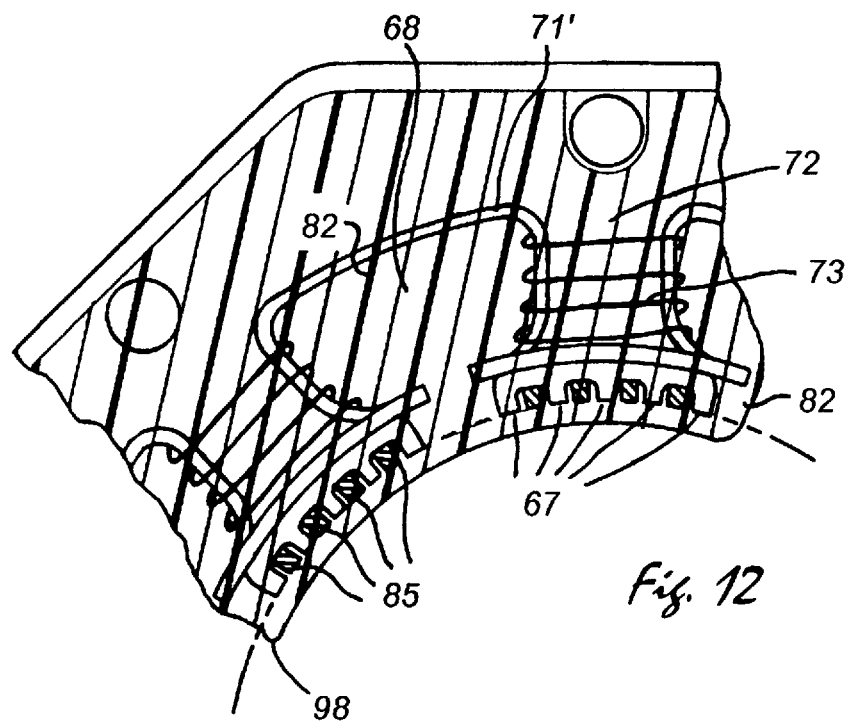
FIG. 12 is a partial view illustrating the partially completed stator assembly of FIG. 9 after injection molding.

After the lamination stack is assembled, and in the optional case where an "enhanced" motor is to be produced, in a step 105 elongate magnetic strips 85 are inserted in each gap between stator teeth 67 (See FIG. 12). As will be described below, the magnets which are inserted between stator teeth tend to enhance the magnetic properties of certain classes of motor. The magnetic strips have sufficient frictional engagement with and magnetic attraction for the gaps into which they are inserted to temporarily maintain the strips in place during subsequent manufacturing steps until they are firmly secured in their gaps by means of injection molded plastic material.

Figure 8:
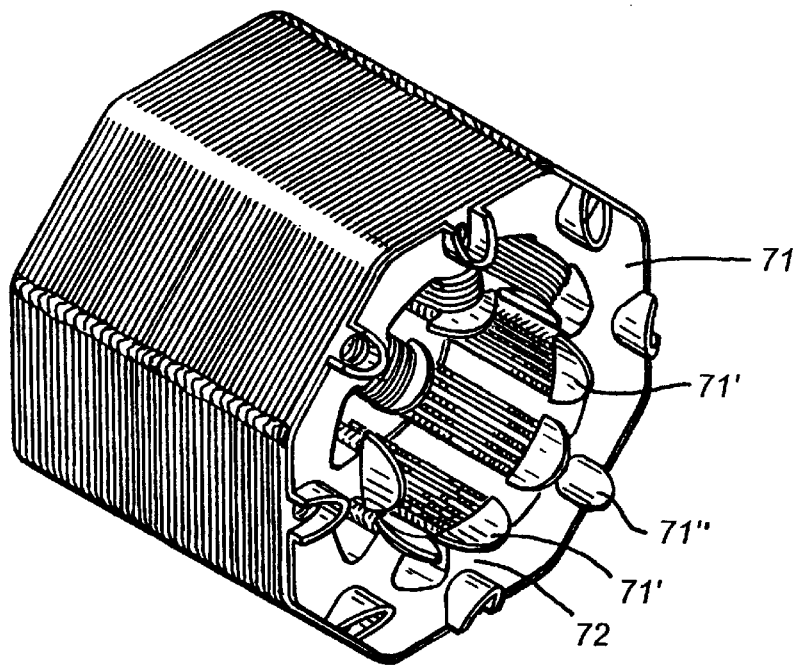
FIG. 8 is a perspective view of the front end of the stator lamination stack of FIG. 7 with insulators and stator windings in place.
Figure 10:
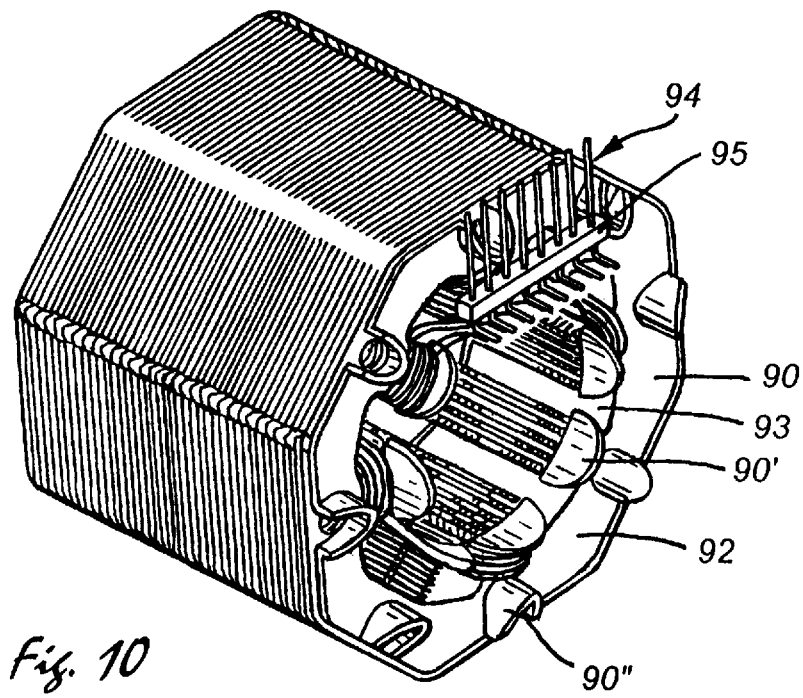
FIG. 10 is a perspective view of the rear end of the unfinished stator assembly, showing the insulators, stator windings, and matrix of connector pins in place.

Following the magnet insertion step 105 if performed, or the simple welding of the lamination stack 105 for a non-enhanced motor, as shown in FIG. 3 subsequent operations are performed on the assembled lamination stack to associate the stator electrical components with the stack and to magnetize the stator poles. In this regard, the stack is insulated, wound, and the windings are terminated. In FIG. 3 the insulation step is indicated at 106. Preferably, discrete insulators are supplied along with the welded stator lamination stack in order to provide appropriate insulation between the stator windings and the lamination stack. Turning briefly to FIG. 8, one end of the insulator assembly is illustrated at 71 and is shown to completely line the slot 68 as well as to cover the face 72 of each pole 66. Upstanding insulator sections 71' help retain the stator windings, and will interface with the end cap when they are juxtaposed. Bolt protectors 71" insulate the fasteners 28 and prevent contact between the fasteners and the windings. A mating end for the insulator is illustrated in FIG. 10 at 90. It is seen that the insulator 90 is similar to the insulator 71 in that it provides a face 92 for insulating the end of the pole, channels 93 which completely line the inter-pole slots, and upstanding projections 90' for retaining the stator windings. FIG. 10 illustrates bolt protectors 90" on the rear facing insulator section. Since the rear end cap 25 is formed from molded plastic and bolts are not used to secure it to the lamination stack 27, it should be appreciated that the bolt protectors 90" are not necessary. However, in a preferred embodiment they are maintained so that insulator sections 71 and 90 are interchangeable and only one type needs to be stocked. Moreover, the bolt protectors 90" provide an irregular face that enhances the bond formed between the molded rear end cap 25 and the lamination stack 27.

Figure 11:
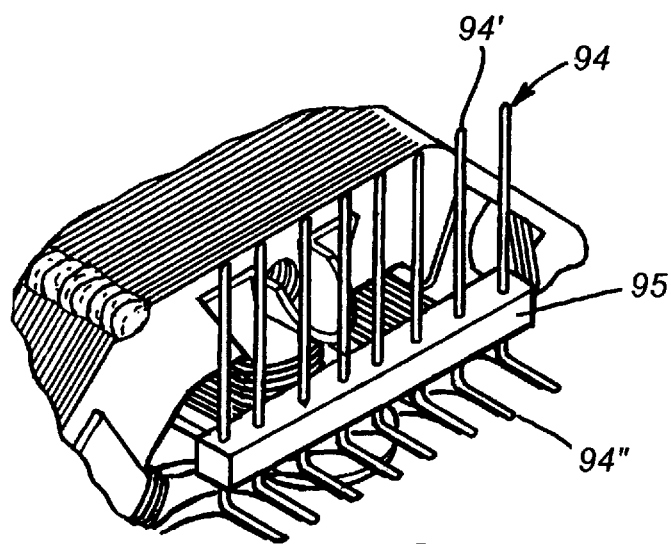
FIG. 11 is a partial view illustrating the matrix of connector pins as disposed in relation to the stator lamination stack.

Having thus insulated the pole structure, windings schematically illustrated at 73 are applied (FIG. 12), preferably automatically, to each of the poles in a step 107 (FIG. 3). The windings serve as means for magnetizing the poles on which they are wound. It will be appreciated that in the typical case, a winding of significant dimension (more significant than illustrated in the FIGS.) will build up in order to get the necessary turns on each pole. It is seen, however, that the turns are insulated from the magnetic structure by means of the insulator sections 71, 90. Having wound the coils in step 107, the coil ends are then terminated in step 108. In this step, conductive pins 94 are aligned in a row or matrix by spacer 95—the pins having a projecting end 94' and a terminating end 94" (See FIG. 11).

In the illustrated motor which has eight pole structures each with a winding, eight pins 94 are provided for terminating the coil ends. Thus, at the start of the windings, a first end of a coil is fusion welded to the terminating end 94" of a pin 94, wound around four poles, then fusion welded to the terminating end of another pin. It should be appreciated that a larger matrix of conductive pins 94 may be desired if, for example, the coils are bifilar wound, if a separate coil is desired for each pole, or alternatively, if a larger number of stator poles are provided.

Having thus configured the stator electrical components including the magnetic stator lamination stack and the associated electrical components, a step 110 (FIG. 3) is performed to assemble the stator. In the preferred embodiment, this step is performed by aligning and securing a front end cap 26 with the lamination stack. Preferably, four self tapping screws 28 secure the end cap 26 to the lamination stack 27, in a fashion sufficient to maintain alignment during motor fabrication, and subsequently during motor operation. As will be described in more detail in connection with FIGS. 14 and 15, the mold fixture is adapted to maintain precise registration between the front end cap 26 and the lamination stack 21. Preferably, the front end cap 26 is cast aluminum, and has pilot holes 80 that align with anchor holes 69 of the lamination stack.

Since, in practicing the invention, the motor is to be pressure filled with a molten plastic, the practice of the invention further contemplates the sealing of the stator elements to prevent leakage of the molten plastic during the injection step. This sealing is accomplished in the present invention during the injection molding process. For example, as will be described below, a yoke is utilized to seal leakage around the front end cap, and pressure applied to the mold during the injection of high pressure molten plastic prevents leakage during the injection step.

In accordance with the invention, the preliminary secured assembly, registered by means of a molding fixture (shown in FIGS. 14 and 15), is permanently secured in position by injection molding of the stator assembly, following which concurrent machining of the bearing surfaces in the end caps and the stator bore provides a registered, fixed stator assembly ready to receive its associated rotor assembly. The molding step 111 (FIG. 3) is better understood by reference to FIGS. 14 and 15 which illustrate the molding step, and FIG. 9 which shows the stator assembly after molding, and after removal of the molded stator from the fixture of FIGS. 14 and 15. Also shown in these figures is the matrix of conductive pins 94 which terminate the stator windings and brings them to the external connector 41.

Preferably, molding is accomplished with a central mandrel inserted through the bore of the stator providing a small clearance between the stator laminations and the mandrel. As a result, a thin layer of plastic 98 covers the stator pole teeth 67 and lines the center bore that houses the rotor. The plastic further surrounds the stator windings, and fills the anchor holes 69. Indeed, during the molding step, molten plastic is forced into and flows through the anchor holes 69 and into aligned pilot holes 80, provided in the front end cap. Once the assembly cools and the plastic has solidified, a plastic mass is integrally formed within the pilot and anchor holes. Preferably, the pilot holes 80 include a chamfered counterbore 80' that cooperates with the plastic mass to securely hold the front end cap in registry with the stator lamination stack.

It is preferred to reinforce the plastic fasteners with self-tapping screws 28. In some embodiments, the molten plastic forced into the apertures in the stator and in the end cap can form plastic rivets which will secure the end cap in place, at least for low loads. In other cases, where operating temperatures can be more severe, or the loads driven by the motor higher, it is preferred to use metal screws to enhance the attachment between the end cap 26 and the stator. It will be appreciated that it is the end cap 26 which is typically used to mount the motor to the apparatus which it drives.

Thus, in the embodiment using screws for enhancing the attachment of the front end cap to the stator assembly, self-tapping screws 28, having a slightly smaller diameter than the end cap holes 80, are self-tappingly screwed into the anchor holes 69 to firmly affix the end cap 26 to the stator housing. Subsequently, during the injection molding step, molten plastic flows through the anchor holes, and into the end cap, to surround the exposed portions of the screws 28. When the motor is then mounted in place by securing the front end cap 26 to the apparatus which it is intended to drive, the affixation provided by the combination of injection molding and self-tapping screws provides a rigid assembly which maintains the integrity of the motor, and resists relative movement between the components of the stator, even in the presence of significant temperature excursions encountered during operation. The steel-to-steel contact between the screws and the stator assembly also serves to eliminate creep during temperature cycling of the motor.

Figure 9:
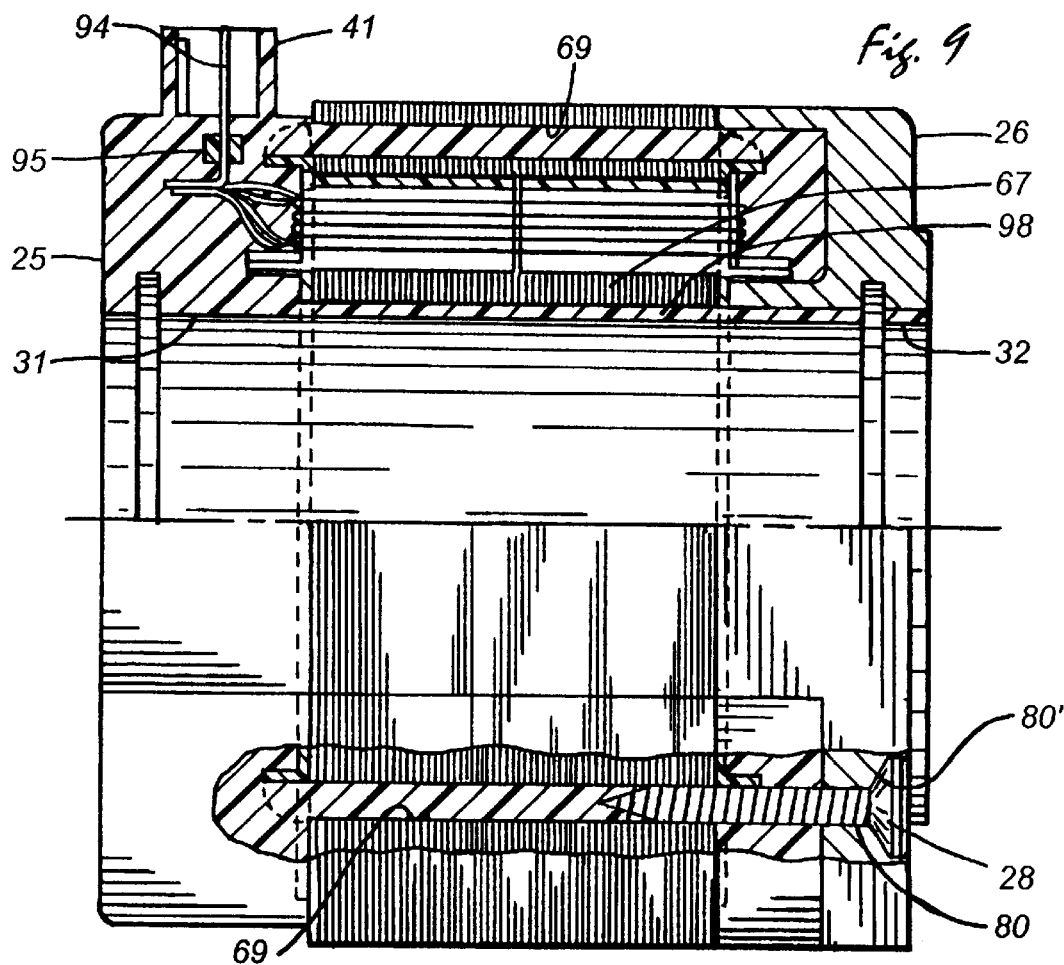
FIG. 9 is the cut-away view as illustrated by arrows in FIG. 6, illustrating a wound stator assembly within the caps and connector in place.

As shown in FIG. 9, the rear end cap 25 is entirely formed by the molded plastic in step 111 (FIG. 3). The plastic of end cap 25 surrounds the conductive pins 94 and spacer 95, to support the pins 94 in a fixed relation, and to form a connector body. Before step 111, and in the preferred embodiment, the pins 94 and spacer 95 are held in place merely by the rigidity of the stator windings that are fusion welded to the pins 94 (See FIG. 11). Alternatively, however, the spacer 95 and conductive pins could be integrally formed with the insulator 90 (FIG. 10), thereby being rigidly disposed prior to step 111.

It will be noted at this point that fusion welding is the preferred means of electrically and mechanically connecting the pins 94 to the terminating ends of the coil wires. Not only is a secure mechanical and electrical connection provided, but that connection can be achieved without the need for stripping the insulating varnish from the wires. The fusion welding step is accomplished without stripping of the insulation, and serves to burn through the insulation at the fusion welded point in order to achieve the aforementioned secure mechanical and electrical bond.

A connector housing 41 is disposed about the conductive pins 94, and is integrally formed as part of the rear end cap 25. Beneficially, this connector 41 configures the motor for ready electrical connection to a cable that is ultimately connected to a motor driver for controlling the motor. It can be appreciated that, in this way, an external controller can be conveniently connected to the stator windings of the motor, and thereby placed in direct control of the motor operation.

In a alternative embodiment, not shown in the FIGS., a motor may be manufactured wherein both the front and rear end caps 26, 25 are formed by high-strength injection molded plastic. It is preferred, however and as illustrated, to retain an aluminum front end cap, due primarily to the heat transfer characteristics of aluminum. More specifically, since aluminum is a better thermal conductor than plastic, maintaining an aluminum front end cap 26 provides better thermal transfer, and therefor better heat dissipation, away from the motor. In this regard, heat dissipation is further improved if the motor is mounted by way of mounting holes 40 (FIG. 2) to a structure that would effectively serve as a heat sink.

Figure 13:
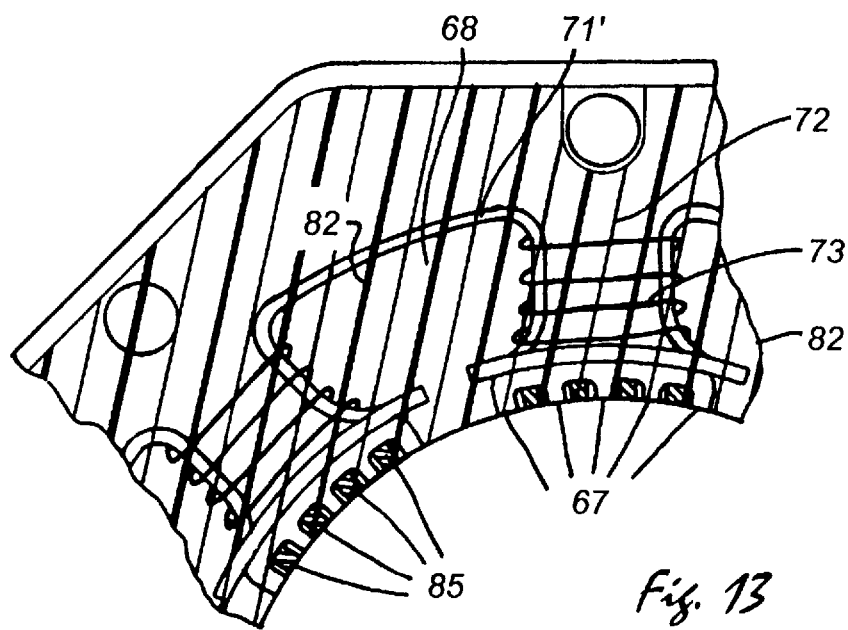
FIG. 13 is a view similar to FIG. 12 illustrating the injection molded assembly after it has been machined and is thus ready for insertion of the rotor assembly.

After molding is completed and the stator assembly removed from the mold fixture, the stator appears as suggested in FIG. 12. The molded plastic material 82 completely covers all of the pole teeth 67, fills all of the voids around the windings as shown in FIGS. 12 and 13, as well as all voids in the end caps, to form a continuous surface extending through the center of the stator assembly. Furthermore, the molded plastic material is selected to have a thermal heat transfer constant which is substantially better than that of air, and thus the motor is better able to conduct heat generated in the stator to the ambient. As a result, temperature buildup in the motor is effectively dissipated, particularly as compared to a motor having a conventional case. Thermal transfer, and thus heat dissipation, is also improved as compared to motors of the type described in the '572 and '604 patents having a potted stator assembly, insofar as the injection molded motors have fewer and smaller pockets of air.

Having thus molded the stator assembly, including end cap 25 in the step 111 (FIG. 3), a step 112 is performed to machine the central bore. Any number of machining techniques can be utilized to form the central bore including boring, grinding, broaching, honing or lapping. In the presently preferred embodiment of the invention, a form of honing, sometimes called diamond-bore finishing, is used, preferably with multiple stations. Lapping can also be used. In very high volume manufacture broaching may be preferable. In the currently preferred practice of the invention, multiple diamond finishing stations are used, and are arranged to assure that some material is removed at each station. The initial cuts remove primarily plastic material from the stator and aluminum from the front end cap. As illustrated in FIG. 9, it is desired to form the center bore so as to leave a thin layer of molded plastic 98 between the stator pole teeth 67 and the sidewalls of the center bore.

Alternatively, it may be desired to continue the honing operation until it has opened the bore 33 so that the tools contact the stator laminations. Thus, as the successive honing operations are carried out, material is ultimately removed from the teeth 72 of the stator assembly and at the same time from the bearing surfaces 31, 32 of the end caps to machine a smooth and continuous bore 33 through the entire stator assembly. The machining in the end caps forms bearing surfaces for slip fit of the rotor bearings while the machining of the lamination stack sharpens the corners of the stator pole teeth 67 to produce a uniform bore for minimum air gap and enhanced magnetic coupling.

It will be appreciated that in practicing the invention no machining was needed on either of the end caps 25, 26 prior to the finishing operation which forms the bearing surfaces. Typically, motors have machined flanges for accurate mounting of the motor in its end use apparatus. Thus, having completed the honing operation and thus formed a central bore in the motor which will define the center line of rotation of the rotor, the bore is used as a registration pilot for machining a mounting flange 38 on the face of the motor. Typically, the flange is machined on a lathe, and subsequent to machining of the mounting flange, the tool is changed and grooves 83 are machined in the bearing surfaces 31, 32 for accepting the retaining rings 35, 36. Following the performance of the step 113 for such finish machining, the stator assembly is prepared to receive a rotor and thus produce an assembled motor.

More particularly, a step 115 is performed in which the rotor assembly produced in the step 103 is joined with the stator assembly in step 113 to produce a completed motor. It is simply necessary to install one of the retaining rings, say, front ring 36 in the end cap 26, then slide the rotor assembly with bearings into the bore 33. Thrust means 36a such as a wave washer and spacers 36b, if necessary, are installed above the bearing to load the bearings in one direction. Following insertion of the rotor, the rear clip 36 is put in place producing a completed motor. A step 116 (FIG. 3) is then performed to magnetize the rotor in a conventional fashion.

One of the significant advantages which is achieved by the assembly techniques of the present invention is the ability to produce "enhanced" stepping motors, that is, motors having magnetic inserts between the stator teeth for enhancing the flux paths and producing correspondingly enhanced performance. Reference is made to the following U.S. patents for a description of the structure and function of enhancement achieved by insertion of magnets in the slots between the teeth of the pole structure: Horber U.S. Pat. No. 4,712,028, Mastromattei U.S. Pat. No. 4,713,570 and Gamble U.S. Pat. No. 4,763,034. FIGS. 12 and 13 of the present application reflect the techniques of the aforementioned patents applied to the instant motor structure.

FIGS. 12 also illustrates the thin runner of material 98 formed over the stator teeth 67 during the molding operation and later machined away. More particularly, referring to FIG. 12, it is seen that molded plastic material completely fills the inter-tooth gap including all interstices between the magnets 85 and the teeth 67, covering all of the magnets and teeth to form a thin layer of plastic material comprising a continuous surface throughout the bore of the motor. FIG. 12 illustrates the motor after molding and prior to honing of the bore. As described in connection with FIG. 9, it is desired, in one embodiment, to leave a thin layer of plastic over the stator pole teeth. Alternatively, it may be desired to continue the honing operation until the stator pole teeth are exposed. To this end, FIG. 13 illustrates the condition after the bore is finished, showing a continuous surface for the internal bore, such continuous surface at different parts including the molded plastic material, exposed teeth 67 and exposed magnets 85 (when present).

In keeping with the description of FIGS. 12 and 13, no attempt was made to illustrate the inserts in the other smaller scale figures in order to avoid confusing those drawings. However, from the illustration of FIGS. 12 and 13, it will now be apparent to those skilled in this art how the enhancement magnets are utilized in practicing the present invention. As shown in FIGS. 12 and 13, magnetic segments 85 are inserted in gaps between the stator teeth 67. While in the past it had been necessary to glue the segments in place then vacuum impregnate the pole faces, or to varnish the stator, such steps can be avoided. More particularly, the magnetic segments 85 preferably are relatively strong magnets such as samarium cobalt. Since the internal diameter of the stator may be honed prior to insertion of the rotor, it will be appreciated that magnetic debris is generated as the magnetic segments are honed. This debris is highly magnetic and tends to adhere to the laminations.

In practicing the present invention, however, the molded plastic material is allowed to enter the internal bore and thus entirely encompasses the magnetic segments 85. A completely smooth bore is provided which remains smooth as it is lapped or honed. Thus, even though highly adherent magnet debris may be generated in the honing operation, since the internal bore 33 is completely smooth, it is a relatively easy matter to mechanically clean the bore, and provide a clean and unobstructed bore in which the rotor can rotate.

FIGS. 12 and 13 illustrate a further benefit of he molding and subsequent honing procedure when used with motors of the enhanced type. It will be appreciated that molded plastic material is forced into any crevice in the inter-tooth gaps, serving as a bonding agent to hold the enhancement magnets in place. Subsequent honing of the molded stator produces a smooth bore in which the stator teeth and magnets may be exposed, molded plastic material also forms a part of that smooth bore and assures the holding of the enhancement magnets in place in the inter-tooth gaps.

The plastic material between the teeth also serves an important purpose for non-enhanced motors as well. In most machining operations, including the preferred diamond finishing operation, material is removed from the stator teeth by a tool which is constantly moving in the same direction, often at a relatively high rate. It is noted that using the preferred diamond finishing technique, it is preferred to utilize a tool speed of about 650 rpm and an advance rate of about 20" per minute. With no backing material between the teeth, particularly with high speed cutting, the shearing effect of the tool against the unsupported tooth would tend to distort the tooth trailing edges as material is sheared from the tooth face. Injection molding of the stator in such a way that all of the inter-tooth gaps are filled with high-strength plastic prior to machining puts a layer of backing material between the teeth such that as the tool removes material from the tooth it is supported by the backing material in the gap and does not distort or shear in such a way as to deform the edge as the tooth is machined. The result is very sharp edges on the teeth substantially free of distortion, and such sharp teeth contribute to the uniformity of magnetic paths through the motor.

Figure 14:
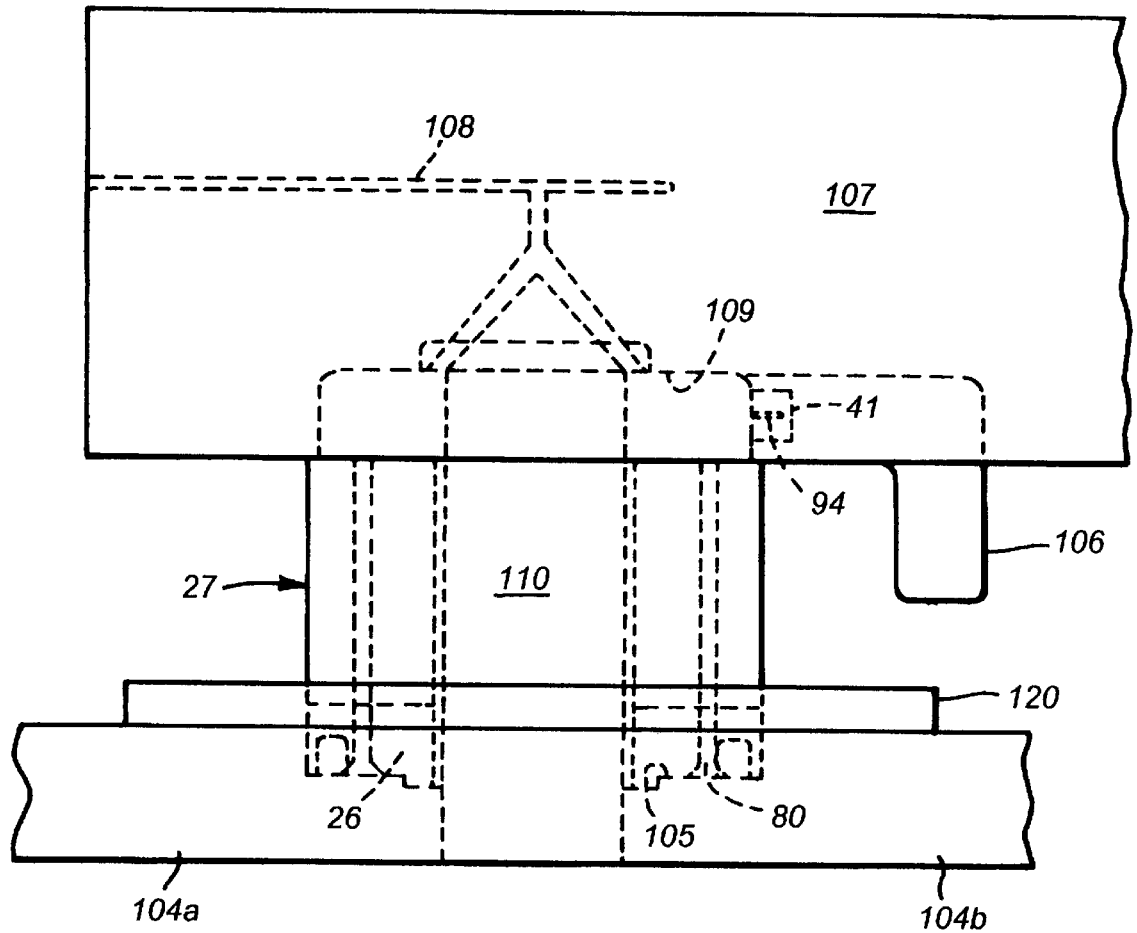
FIG. 14 is a side elevational view showing a mold fixture used in fabricating the motor assembly of the present invention.
Figure 15:
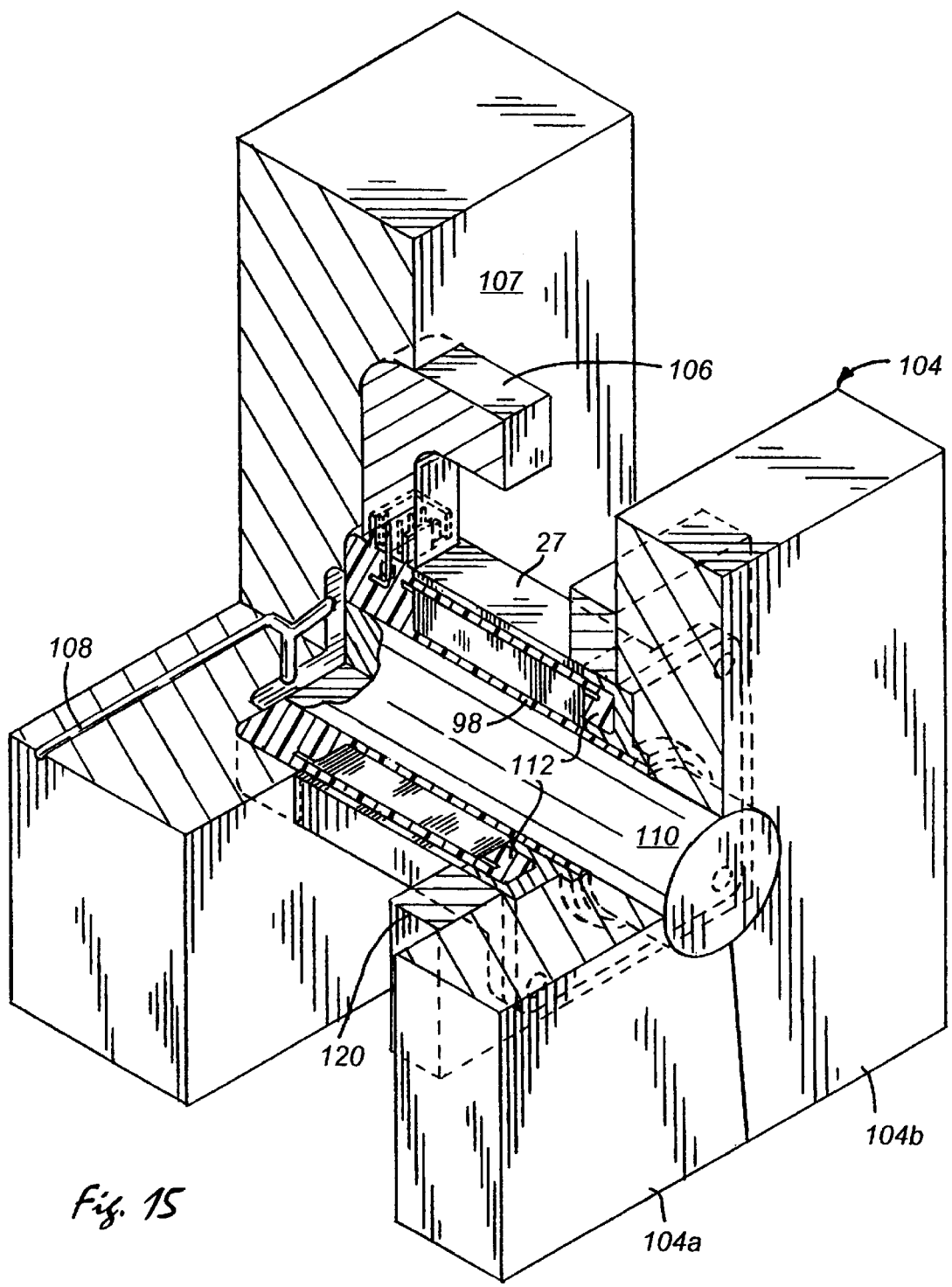
FIG. 15 is a perspective view with a partial cut-away of the mold fixture shown in FIG. 14.

Having been briefly referenced previously, more detailed reference will now be made collectively to FIGS. 14 and 15, showing the mold fixture. As used herein, the terms "plastic", "molten plastic", "high strength molten plastic", "molded plastic material" and "plastic material" are defined as any thermoplastically processible resin. Examples of suitable thermoplastic resins include, but are not limited to, thermoplastic resins such as 6,6-polyamide, 6-polyamide, 4,6-polyamide, 12,12-polyamide, 6,12-polyamide, and polyamides containing aromatic monomers, polybutylene terephthalate, polyethylene terephthalate, polyethylene napththalate, polybutylene napththalate, aromatic polyesters, liquid crystal polymers, polycyclohexane dimethylol terephthalate, copolyetheresters, polyphenylene sulfide, polyacylics, polypropylene, polyethylene, polyacetals, polymethylpentene, polyetherimides, polycarbonate, polysulfone, polyethersulfone, polyphenylene oxide, polystyrene, styrene copolymer, mixtures and graft copolymers of styrene and rubber, and glass reinforced or impact modified versions of such resins. Blends of these resins such as polyphenylene oxide and polyamide blends, and polycarbonate and polybutylene terephthalate, may also be used in this invention.

A preferred thermoplastic resin is a glass reinforced polyethylene terephthalate thermoplastic molding resin such as that sold by E. I. du Pont de Nemours and Company of Wilmington, Del., under the trade name Rynite 530.

Optionally, the thermoplastic resins may contain flame retardant additives. The thermoplastic resins may also contain various types of reinforcements or fillers. Fiberglass or carbon fiber may be used to provide reinforced plastics. Various colored pigments may be added to the resin, such as titanium dioxide. Clays, calcium phosphate, calcium carbonate may be used as bulk fillers, and many other fillers such as talc and mica may be used to reinforce the material, to add strength or to modify other properties of the finished product such as stiffness. The resins may also contain plasticizers, and heat and light stabilizers. The amount of reinforcements or filler used may vary from about 1 to 70 weight per cent based on the weight of the polymer and filler present. The preferred type reinforcement is fiberglass, and it is preferred that the fiberglass be present in the amount of about 15 to 55 weight percent based on the total weight of the polymer and filler present. The thermoplastic resins may be prepared by methods well known in the art. When reinforcements or fillers are used, they may be added to the thermoplastic polymers during the preparation of the resins or compounded in a separate step according to conventional methods known in the art. Preferably, the mold fixture includes a front portion comprising a split-frame 104 having portions 104a and 104b which unite to enclose the front end cap 26. A yoke member 120 is associated with the frame 104a, 104b to assist in holding the apparatus together when a high pressure is applied to the dies in the injection molding process. Typically, pressures are applied during injection molding which correspond to about 4,000 psi and without the yoke surrounding the end cap, the material of the end cap would likely rupture. The high pressure applied to the die, in conjunction with the yoke 120, also tends to seal the line formed at the junction of the front end cap 28 and the stator assembly, so that the molten plastic injected under pressure will be retained within the motor and not flow through the potential leakage path between the end cap and stator assembly. Frame 104 also includes a recess 105 (FIG. 14) that conforms to front end cap 26, whereby the face of end cap 26 abuts the frame recess 105, advantageously providing a backing surface which prevents molten plastic from flowing out of pilot holes 80.

The mold fixture also includes connector insert 106 and rear portion 107. The rear portion 107 includes channel 108 which defines a fluid passage through which molten plastic flows to reach the stator assembly. The rear portion 107 also includes a cavity 109 that defines the space for the rear end cap 25, which is formed from the injected plastic. The connector insert 106 is disposed alongside the rear portion 107 so as to form a connector 41 (FIG. 1) that is integrally formed with the rear end cap 25.

The mold fixture further includes a mandrel 110 that is inserted through the center of the stator assembly to form the central cylindrical bore. The mandrel 110 has a slightly smaller diameter than the sidewalls of the stator assembly 27, as defined by the inwardly projecting stator poles 67, thereby providing a small cylindrical gap in which molten plastic flows to cover the pole teeth. (See Also FIG. 9) The mandrel 110 is secured in registry between the front and rear end portions 104 and 107 of the mold fixture, and, in this way, insures proper alignment of the central bore within the stator assembly.

Once the stator assembly 27 is secured within the mold fixture, pressure is applied to the fixture, and molten plastic is injected under pressure into channel 108. The channel directs the molten plastic to the chamber 109, which it fills to define the rear end cap 25. The molten plastic flows under pressure throughout other parts of the stator assembly, including the space 68 between stator poles (FIG. 6), the anchor holes 69 and pilot holes 80, the annular chamber 112 defined by the front end cap, and the cylindrical gap between the stator poles 67 and the mandrel 110 to form runner 98 (FIG. 15). Once the assembly cools and the plastic has solidified, then the mold fixture is removed, and the honing process and rotor assembly previously described are carried out.

It is worthwhile to note that the injection molding operation is a relatively rapid manufacturing process, and the subsequent cooling operation is also correspondingly fast. In contrast to prior molded motors which require one or two cure cycles in an oven, according to the present invention, the molten plastic which is injected into the motor at a very high temperature begins to cool almost immediately. Shortly after completion of the injection cycle, the plastic has cooled sufficiently to solidify. Once that occurs, the pressure on the mold is released, and the motor can be brought to the next station for a subsequent operation, and will cool in the interim. There is no need for oven curing of the internal material, simply adequate time to cool the plastic mass after solidification, so that subsequent operations can be performed. A typical 2 hour process time for the potted motor (pot and cure cycle) is reduced to under a minute with the injection molding process taught herein.

The nature of the connections between the terminating ends of the coil and the pins of the connector are also worth noting. The injection molding process operates at a temperature which is incompatible with many common forms of printed circuit boards, and thus the printed circuit boards which had been used in the past would require special adaptations in order to render them compatible with injection molding temperatures. Thus, special printed circuit boards with foils adequately adhered to the substrate to withstand injection molding temperatures would be needed.

In the practice of the present invention, those difficulties are avoided by the use of metal pins which are fusion welded directly to the terminating ends of the coils. This not only eliminates the need for and cost of the printed circuit board, but also provides a secure mechanical and electrical connection which is entirely compatible with the temperatures and pressures of the injection molding process.

It will also be noted that some but not all of the advantages may be achieved in certain modified constructions of the invention. For example, in low cost motors and referring to FIGS. 16–18, the bearing surface 31 in the rear end cap 35 can be made to accommodate a much smaller bearing than the bearing surface 32 of the front end cap. It is appreciated that the primary bearing wear in a motor is on the front bearing, and thus economies of production can be achieved by utilizing a smaller bearing at the rear of the shaft. That arrangement is readily adapted to the invention, except that the formation of the central bore of the stator is modified. A further alternative illustrated in these figures, as will be described in greater detail below, is the application of the invention to different motor types. The motor of FIGS. 16–18 is configured as an inexpensive universal motor, rather than as the stepper of the preferred embodiments.

The stator assembly is shown in FIGS. 16 and 17 as including a cylindrical stator body 150 having a pole structure 151, 152. The pole structure is either formed as a part of the body 150, or alternatively, can be attached to the body. Windings 153, 154 serve to magnetize the poles 151, 152.

In the low-cost motor of FIGS. 16–18 it is preferred to form both of the end caps by injection molding. Thus, a front end cap 155, having mounting holes 156 formed to serve the purpose of a mounting flange, is formed at one end of the stator body 150. A rear end cap 157, preferably having an electrical connector 158 formed therein, is positioned at the other end of the cylindrical body 150. As best seen in FIG. 17, a plastic mass 160 fills the stator, with the exception of a cylindrical aperture 161 which is adapted to receive the rotor. The plastic mass extends to both the end caps 156, 157 and in the illustrated embodiment actually forms both of such end caps. It will be seen that the plastic mass 160 encapsulates the windings 154 and fills all of the available voids within the stator body 150.

The rotor for this motor is shown in FIG. 18. A central cylindrical portion 170, which is illustrated in the drawing only schematically, forms the magnetically active portion of the rotor. It is positioned on a central shaft 171 intermediate a pair of bearings or bearing surfaces. As in the prior embodiment, a relatively large diameter bearing 172, which is of about the same diameter as the rotor portion 170 (preferably slightly larger than the rotor portion) is positioned on one end of the shaft. The second end of the shaft in the FIG. 18 embodiment is simply machined at 173 to interface with a bushing positioned in the associated end cap. When the motor is configured as a universal motor, the central portion of the rotor 170 will be formed to include a commutator for interaction with brushes positioned in the stator assembly. Although not illustrated in the drawings, the universal motor also has brushes in the stator to function with a commutator on the rotor. The brush holder description contained in the DC motor description (FIGS. 19–20) also applies to the motor described in FIGS. 16, 17 and 18. This is not shown in order to preserve clarity, and to focus on the potting aspect of the invention.

Turning attention again to the stator, it will be seen that the bore 161, as best seen in FIG. 16, is continuous from the front end cap 156 through the central portion of the rotor, but stops short of the rear end cap 157. A bearing mounting surface 174 is formed in the front end cap 156 for supporting the bearing 172. The rear end cap 157 has a smaller aperture 175 to also serve as a bearing support. Positioned in the aperture 175 is a bushing 176 which interfaces with a machined surface 173 on the rotor shaft to form a bearing structure for the rear end of the rotor shaft. While the central bore is thus stepped, the motor provides the advantageous features of the invention, including at least one injection molded end cap, with that end cap having a bearing support surface formed therein for support of the rotor shaft. The stator is encapsulated with an injection molded mass to provide a smooth bore, good heat transfer and dissipation, and a sturdily unitized structure. Electrical connections can be made as in the prior embodiment.

A number of alternatives are also available with this motor configuration. Among them is the possibility of eliminating the honing or lapping of the central portion of the bore 161, and in some cases, the machining of the bearing support surfaces. Thus, in some applications, particularly such as a universal motor where the size of the air gap between the rotor and the poles of the stator is not so critical, the internal surface 179 of the central portion of the stator can be left in its "as molded" configuration without additional lapping or honing. Thus, the only machining operations which might be performed are those which form the bearing support surfaces 174, 176 in the respective end caps 155, 157. The use of a bushing 175 also illustrates a further alternative in which the bearing support surfaces need not be machined. Thus, the surfaces 174, 175, in a particularly inexpensive motor, can simply be molded to an appropriate size, and bearing members press fit into the molded apertures. Bushings such as the metallic bushing 175 illustrated in FIG. 16 can be used or polymeric bushings can also be used in the same way. This structure is particularly advantageous for a very low cost motor such as a motor which might be used in automotive applications for seat positioners or the like. That form of motor is also better illustrated in FIGS. 19 and 20 which represents a DC motor of inexpensive construction which can make use of press fit bearing structures, such as press fit polymeric bearings to reduce the manufacturing costs of such motor.

FIGS. 19 and 20 show an alternative configuration which is like the earlier alternative in the provision of bearing surfaces in the respective end caps of different size, but which differs from that embodiment in the electrical and magnetic form of the motor. The motor of FIGS. 19 and 20 is a permanent magnet motor. As such, the poles require no windings, and the permanently magnetized polarization of those motors provides the means for magnetizing the poles.

Turning to the drawings more specifically, it will be seen that the stator is based on a stator body 180. As best shown in FIG. 20, a pair of permanent magnets 181, 182 are attached or affixed to the body 180. The motor of FIGS. 19 and 20 can be formed with a metal front end cap or an injection molded front end cap, as desired. In order to reduce cost in the motor of FIGS. 19 and 20, the front end cap 183 is injection molded, as is the rear end cap 184. A mounting flange with mounting holes in the front end cap 183 is shown at 185.

As in the other embodiments, an injection molded plastic mass 187 is formed in the stator body which encapsulates the poles and the magnetic structure 181, 182, fills all voids in the body, forms at least the rear end cap 184, and in this case also the front end cap 187. This embodiment also shows the use of short locating pins 190 which are affixed to the metallic part of the stator body and serve as anchors for the plastic mass after it solidifies.

The motor of FIGS. 19 and 20 is a DC motor, and thus the rotor requires a commutator structure illustrated at 192. Brush holders 193, 194 are permanently fixed in position in the plastic mass during the injection molding process. As is conventional, brush holder caps are provided to allow removal of brushes 193a, 194a for motor maintenance. Wiring 195 is shown schematically as connecting the brush holders to a connector 196. Thus, the entire brush structure is permanently fixed in position along with its wiring during the injection molding process.

The motor of FIGS. 19 and 20 also shows the implementation of cost reduction by means of a reduced size rear end cap bearing. Thus, the front end cap 183 has a bearing support surface 200 formed therein which is about the same size as the central bore 201. The rear end cap 184, however, has a smaller diameter bearing support surface 202 formed therein. Roller bearings could be used as the bearings in the front and rear end cap. However, for the low cost version, the motor of FIG. 19 preferably employs bushings press fit into the bearing support surfaces 200, 202 and engaging machined sections of the rotor shaft 206. Preferably, the support surfaces are injection molded with sufficient precision and adequate finish to allow the bushings to be press-fit into position without the need to first machine the bearing support surface.

In all of these alternative embodiments, the stator of the motor is injection molded as has been described in detail above to completely encapsulate the poles, windings and other materials in the stator, and to form a smooth bore through the center of the stator. In one embodiment, the major length of the bore, that in the region of the poles, is simply that which is formed by the mandrel in the injection molding fixture, and only the bearing surfaces in the front and rear end caps are machined. In the alternative embodiment, a smooth bore is machined through the front end cap and the pole section of the stator, and a second smaller diameter bearing surface machined in the rear end cap. In a further alternative, no machining is required for the bore or the bearing support surfaces. In all cases, however, the central bore which is presented to the rotor is a substantially continuous mass filled by the injection molded potting material, and the fact that the stator is filled with such material provides enhanced properties such as thermal conductivity.

It will now be appreciated that what has been provided is a new and reliably assembled electrical motor in which the stator is assembled from substantially unmachined parts. After a lamination stack is assembled, insulated, wound and terminated, an unmachined end cap is disposed at the front end of the lamination stack and initially secured in register to form an intermediate assembly. Once the intermediate assembly is secured, it is then molded to form a rear end cap and integral connector, and permanently locks in register that which had been initially secured. An internal bore is then machined to produce a straight, smooth uninterrupted central bore for receiving the rotor, and forms bearing surfaces in the end caps. A previously assembled rotor assembly is then inserted into the smooth bore of the stator assembly, secured in place, and the motor, after magnetization of the rotor, is ready for service.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of producing an electrical motor comprising the steps of:

constructing a rotor assembly on a rotor shaft, the rotor assembly having bearings disposed near the ends of the rotor shaft;

forming an intermediate stator assembly by assembling a stack of stator laminations having stator poles, insulating the stator poles, and wrapping the stator poles with stator windings;

placing the intermediate stator assembly into a mold fixture that includes an internal cavity shaped to define a rear end cap for the stator assembly and a mandrel projecting through the center of the intermediate stator assembly to form a central bore;

unitizing the stator assembly by injecting molten plastic under pressure into the mold fixture, whereby the molten plastic is forced into the intermediate stator assembly to encapsulate the stator windings, fill interior voids, and fill the mold cavity to form a unitary rear end cap;

cooling the assembly to solidify the molten plastic into a plastic mass, the plastic mass extending to and including the formed end cap, forming a continuous bore through the center of the molded stator assembly to accommodate the rotor assembly, the continuous bore also producing mounting surfaces for receiving the rotor assembly bearing; and mounting the rotor assembly into the stator assembly by inserting the rotor assembly into the continuous bore and engaging the rotor bearings with the mounting surfaces.

2. The method of claim 1, wherein the mold fixture includes a connector forming portion, and the method further includes the step of disposing the connector forming portion in relation to the mold cavity that forms the rear end cap, so that the unitizing step forms a plastic connector that is integral with the rear end cap.

3. The method of claim 2, further including the step of providing a plurality of conductive pins and electrically connecting the conductive pins to the stator windings, and further positioning the conductive pins within the connector forming portion of the mold to provide proper alignment of the conductive pins with the connector.

4. The method of claim 2 further including the steps of providing a plurality of conductive pins, fusion welding the conductive pins to the stator windings for forming mechanical and electrical connections therewith, and fixing the pins in position by flowing molten plastic under pressure around the pins in the step of unitizing.

5. The method of claim 1, wherein the forming step includes stacking stator laminations having aligned anchor holes, winding the lamination stack with stator windings, and positioning a front end cap having pilot holes aligned with the anchor holes in the lamination stack.

6. The method of claim 5, wherein the molten plastic in the unitizing step flows through the anchor holes and into the pilot holes of the end cap.

7. The method of claim 5 including the step of inserting metal fasteners to secure the front end cap to the lamination stack prior to the step of unitizing.

8. The method of claim 1, wherein the forming step includes inserting an insulator into the intermediate stator assembly so as to surround the stator poles, and wrapping the stator windings over the insulator.

9. The method of claim 8, wherein the molten plastic in the unitizing step is formed so as to encapsulate the insulator, stator poles, and stator windings.

10. The method of claim 1, wherein the molten plastic in the unitizing step is formed so as to encapsulate the stator poles and stator windings and to form a front end cap opposite the rear end cap.

11. The method of claim 1, further including the step of fusion welding a plurality of conductive pins to the stator windings.

12. The method of claim 11, wherein the plastic is molded to form a rear end cap having an integral connector that surrounds the plurality of conductive pins.

13. The method of claim 1, wherein the stator laminations have a plurality of inwardly facing stator poles, each pole having a plurality of pole teeth separated by gaps, and in which the molten plastic encapsulates the stator assembly in such a way as to deposit plastic in the gaps between the stator teeth.

14. The method of claim 1, further comprising the step of providing as the plastic a thermoplastically processible resin selected from the group consisting of 6,6-polyamide, 6-polyamide, 4,6-polyamide, 12,12-polyamide, 6,12-polyamide, polyamides containing aromatic monomers, polybutylene terephthalate, polyethylene terephthalate, polyethylene napthhalate, polybutylene napthhalate, aromatic polyesters, liquid crystal polymers, polycyclohexane dimethylol terephthalate, copolyetheresters, polyphenylene sulfide, polyacylics, polypropylene, polyethylene, polyacetals, polymethylpentene, polyetherimides, polycarbonate, polysulfone, polyethersulfone, polyphenylene oxide, polystyrene, styrene copolymer, mixtures and graft copolymers of styrene and rubber, and mixtures thereof.

15. The method of claim 14, further comprising the step of adding to the resin a filler.

16. The method of claim 14, further comprising the step of adding to the resin a reinforcement of fiberglass or carbon fiber.

17. The method of claim 1, further comprising the step of providing as the plastic a glass reinforced polyethylene terephthalate thermoplastic molding resin.

18. A method of producing an electrical motor comprising the steps of:
   constructing a rotor assembly on a rotor shaft, the rotor assembly having a central rotor adapted for support by bearings located near the ends of the rotor shaft;
   forming an intermediate stator assembly having stator poles and means for magnetizing the stator poles;
   placing the intermediate stator assembly into a mold fixture that includes an internal cavity shaped to define a rear end cap for the stator assembly and a mandrel projecting through the center of the intermediate stator assembly to form a central bore;
   unitizing the stator assembly by injecting molten plastic under pressure into the mold fixture, whereby the molten plastic is forced into the intermediate stator assembly to encapsulate the stator poles, fill interior voids, and fill the mold cavity to form a unitary rear end cap;
   cooling the assembly to solidify the molten plastic into a plastic mass, the plastic mass forming a central bore extending between the formed rear end cap and another end cap, the central bore being of a size adequate to closely receive the rotor of the rotor assembly;
   forming bearing support surfaces in the end caps, the bearing surfaces being sized to receive the bearings adapted to support the rotor; and
   mounting the rotor assembly into the stator assembly by inserting the rotor assembly into the continuous bore and engaging the rotor bearings with the mounting surfaces.

19. The method of claim 18 wherein the step of forming bearing support surfaces in the end caps includes machining mounting surfaces in the end caps for receipt of the bearings adapted to support the rotor.

20. The method of claim 18 in which the step of forming bearing support surfaces in the end caps includes pressing bushings into the end caps to serve as the bearings adapted to support the rotor.

21. The method of claim 18 wherein the step of forming an intermediate stator assembly includes winding the stator poles to provide a magnetic structure serving as the means for magnetizing the stator poles.

22. The method of claim 18 wherein the step of forming an intermediate stator assembly includes mounting permanent magnets in the stator assembly, the magnetic polarization of the permanent magnets providing the means for magnetizing the stator poles.

23. The method of claim 18 wherein the step of forming bearing support surfaces forms a larger diameter bearing support surface in the front end cap than in the rear end cap.

24. The method of claim 23 in which the step of forming the bearing support surfaces includes the step of machining a smooth continuous bore through the front end cap and the central bore but terminating short of the rear end cap, and machining a smaller diameter bearing support surface in the rear end cap.

25. The method of claim 18 further comprising the step of providing as the plastic a thermoplastically processible resin selected from the group consisting of 6,6-polyamide, 6-polyamide, 4,6-polyamide, 12,12-polyamide, 6,12-polyamide, polyamides containing aromatic monomers, polybutylene terephthalate, polyethylene terephthalate, polyethylene napthhalate, polybutylene napthhalate, aromatic polyesters, liquid crystal polymers, polycyclohexane dimethylol terephthalate, copolyetheresters, polyphenylene sulfide, polyacylics, polypropylene, polyethylene, polyacetals, polymethylpentene, polyetherimides, polycarbonate, polysulfone, polyethersulfone, polyphenylene oxide, polystyrene, styrene copolymer, mixtures and graft copolymers of styrene and rubber, and mixtures thereof.

26. The method of claim 18, further comprising the step of providing as the plastic a glass reinforced polyethylene terephthalate thermoplastic molding resin.

27. The method of claim 1 wherein the step of forming a continuous bore comprises machining said continuous bore through the center of the molded stator assembly to accommodate the rotor assembly and to form said mounting surfaces for receiving the rotor assembly bearings.

28. The method of claim 27 wherein the step of machining comprises honing said continuous bore.

* * * * *